Patented Jan. 6, 1931

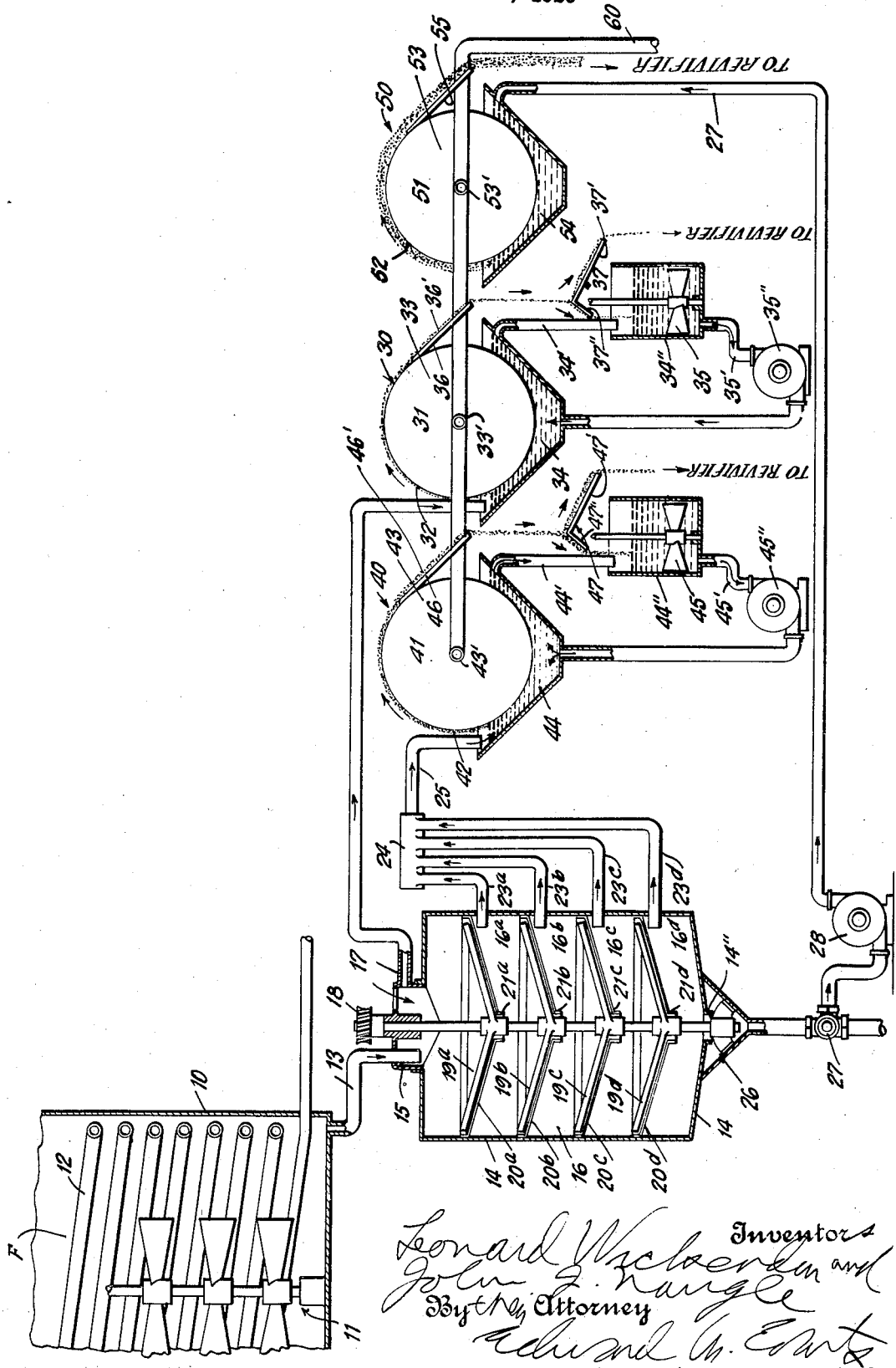

1,787,502

UNITED STATES PATENT OFFICE

LEONARD WICKENDEN, OF FLUSHING, AND JOHN J. NAUGLE, OF BROOKLYN, NEW YORK; SAID LEONARD WICKENDEN ASSIGNOR TO SAID JOHN J. NAUGLE

METHOD OF TREATING SACCHARINE FLUIDS

Application filed January 28, 1926. Serial No. 84,480.

Our present invention relates to methods of treating fluids to purify the same, and aims to devise methods of the general character specified which are simple to practice, which require simple apparatus for their practice, which permit numerous simplifications and economies in operations to be effected, and which permit a very efficient treatment of the fluids and an equally efficient use of the purifying materials employed with a view to a most effective treatment of the particular class or classes of impurities contained in the fluids being treated, all with a view to purifying such fluids by the use of a purifying agent in subdivided form which is adapted also to serve as a filtering medium. While not limited thereto, our present invention may be applied with particular success to the treatment of saccharine fluids, such as sugar juices and melts, affinations and other "run-offs", syrups and molasses, to decolorize and otherwise purify the same either partially or completely, and to remove therefrom, wholly or partially, such impurities as gums, pectins, solid suspended cellulose and other foreign bodies and the like.

In one of its forms, the present invention concerns particularly the treatment of fluids for the purification and filtration of the same by their treatment with what may be termed a "complex" decolorizing and filtering or like purifying medium in subdivided form, two or more fractions of which material preferably exercise different or selective degrees of adsorption or attraction for different or various classes or types of impurities present in the fluid being treated, said fractions of the subdivided purifying medium preferably having different density or other characteristics with respect to the fluid being purified thereby so as to permit their separate removal by what may be termed "fractionation", together with the impurities selectively or otherwise adsorbed by the respective fractions of the subdivided purifying medium, after which the respective fractions and the portions of fluid in which the same are carried may be separately treated and purified fluid recovered from the separate portions of fluid.

In one of its forms, our present invention comprises also the treatment of the fractions of used or partially or completely spent subdivided purifying medium, either separately or collectively, to revivify the same, that is, to restore to the same all or a part at least of the original decolorizing or other purifying powers of such purifying medium. Other objects and advantages of the methods of the present invention will in part be pointed out in detail hereinafter and will in part be obvious to those skilled in the art to which the present invention relates. It is, however, to be clearly understood that the invention is not to be limited in scope or character by this preamble, which is explanatory and illustrative merely, the invention being defined in the appended claims.

In the accompanying specification we shall describe several illustrative embodiments of the methods of the present invention. In the accompanying specification we shall likewise describe, and in the annexed drawing show, one more or less diagrammatic arrangement of apparatus which may be used for practicing several of the aforesaid illustrative embodiments of the methods of the present invention. It is, however, to be clearly understood that our invention is not limited to the specific embodiments of the process herein descibed for purposes of illustration only. It is also to be clearly understood that our invention is not limited to its practice in the illustrative type of apparatus herein more or less diagrammatically shown and described, it being clear that the process may be practiced in its various forms in other types of apparatus, the apparatus not being a part of the present invention but being more fully described and being fully claimed in a copending application of ours filed of even date herewith bearing Serial No. 84,481 and entitled "Means for treating saccharine fluids".

Before describing the aforesaid illustrative embodiments of the present invention in detail, it may be desirable briefly to point out the shortcomings and disadvantages of the prior art so far as the same relate to the field of the present invention: Hitherto, in the purification of fluids, by which we mean the removal from a fluid of a part or all of the impurity or impurities which would tend to give it color, or odor, or render it difficult to filter, or render the sugar or other values thereof difficult to recover therefrom through crystallization or otherwise, or which would impart to such a fluid two or more of these or other undesirable qualities, it has been customary to treat such impurities, which may be termed "physical impurities" for the reason that they may be removed by physical, as distinguished from chemical, means, as one class or group, the fluid being treated as if the impurities contained therein were all of one type all adapted to be removed by similar or identical physical means. These impurities generally consist of dissolved or suspended coloring substances, dissolved or suspended odor-imparting substances, dissolved or suspended crystalline or other mineral substances, and dissolved or suspended colloidal substances, such as gums, pectins and other colloids, together with the usual mineral and organic foreign bodies, such as silicious and cellulosic substances.

To summarize this situation, these impurities, of varying properties and characteristics, have all been treated as if they comprised a single similar or identical group of impurities, no differentiation being generally drawn between the different types of impurities contained in solution or in suspension in the fluid to be purified. Furthermore, there has not been provided in the art hitherto a purifying and filtering medium which was adapted to fractionally or selectively treat the different types of impurities generally present in fluids to be treated, taking as a specific example, by way of illustration only, the class of fluids known as saccharine fluids and comprising, for example, sugar juices, sugar melts, affinations and other "run-offs," syrups and molasses, which fluids generally contain coloring and flavor-imparting substances, suspended and dissolved colloids, such as gums, pectins and the like, and mineral impurities in the form of dissolved salts or suspended silicious or other bodies. It has been customary, generally, to filter such solutions, in order to purify the same, by treating the same with a more or less uniform and homogeneous subdivided filtering medium, without regard to the specifically different types of impurities in solution or in suspension in such fluids and which, for the proper and most expeditious and economical filtration of such fluids, should, theoretically, at least, have different materials applied to them in order to get the highest rates of filtration and filtrates of maximum density and purity.

Further discussing the prior art, it is to be noted that the purifying and filtering media hitherto used were likewise actually or in practice treated as homogeneous and uniform substances without any differentiable or distinguishing characteristics in their various portions or fractions, distinguishing characteristics which might be used to advantage for treating the various types of impurities present in the saccharine or other fluids to be purified.

We have discovered that great economies in operation and great improvements in rates of filtration and in the purity of the filtrates which may be obtained with a given amount of certain types of purifying and filtering media and with a given capacity of equipment, may be obtained by taking into account the different classes or types of impurities present in suspension or in solution in the saccharine or other fluids to be purified and by treating such fluids with a complex purifying and filtering medium under such conditions that various components or fractions of the complex purifying and filtering medium will exercise what may be termed selective actions upon two or more of the various types of impurities present in such fluids, either in suspension or in solution. In other words, we propose to treat the fluids, in accordance with the principles of the present invention, by adding thereto a complex purifying and filtering medium containing at least two distinct portions or fractions which function differently with respect at least to two groups of impurities present in the fluids to be treated.

The different portions or fractions of the purifying and filtering medium may either be present in such medium at one and the same time, as a result of its process of manufacture, for example, or such complex medium may be blended together. Furthermore, such two or more fractions of the purifying and filtering medium may vary in density, or in fineness, or in their adsorptive properties for as many different types or classes of impurities present in solution or in suspension in the fluids to be purified. Or such fractions of the purifying and filtering medium may differ in other respects, provided such differences permit the selective adsorption of the different types of impurities, divided into two or more classes, and the separate recovery of the different fractions with their selectively adsorbed impurities each in a portion of the fluid being treated. This arrangement is desirable so that such separate portions of fluid containing the separate fractions or portions of the subdivided purifying and filtering medium and their respectively adsorbed impurities may be separately treated under optimum conditions to obtain in the most expeditious and economical manner separate fractions of pure filtrate from such portions of fluid and contained purifying and filtering medium and its adsorbed impurities.

Thereafter, the separated fractions of the fluid, containing in suspension or otherwise therein the respective fractions of the purifying and filtering medium and their respectively adsorbed impurities of the various types or classes referred to, are separately treated, as in separate filtering or equivalent units. There thus results separate fractions of pure filtrate which may now be mingled together or otherwise disposed of as desired.

Due to the fact that separate portions or fractions of the purifying and filtering medium are obtained, carrying with them their respective classes of impurities (although it here should be stated that no absolutely clear line of demarcation between the different classes of impurities can be drawn by theory or is suggested by practice, the various classes overlapping and the various fractions of the purifying and filtering medium absorbing some of the other classes of impurities to some extent) the separate portions of fluid, containing such various fractions of the purifying and filtering medium, may be separately treated under conditions which will facilitate the most rapid rates of filtration for each fraction of fluid. Furthermore, the various fractions of the purifying and filtering medium may now be either collectively or separately revivified to restore to the same all or a part at least of their original purifying power. Where such fractions are separately treated for this purpose, it will be apparent that the various types of impurities adsorbed by such fractions may be taken into account in the revivification of such separate fractions, so that here also a gain may be made, under certain conditions, in the efficiency of the revivification process, although, of course, the various fractions of partially or completely spent purifying and filtering medium may be mixed together and revivified collectively.

Turning now to the aforesaid illustrative embodiments of the methods of the present invention, and by way of showing specific examples of the application of the principles of the present invention to specific fluids, we shall describe the principles of the present invention in the following portion of the specification as applied more particularly to the purification of saccharine fluids, by which we mean the fluids designated above and comprising, for example, sugar juices, sugar melts, affinations and other "run-offs", syrups and molasses. These fluids contain certain crystalline and colloidal coloring substances and odor-imparting substances in solution and in suspension, as well as certain colloids, such as gums, pectins and the like, which impede the filtration and purification of such fluids. In addition to these substances, these solutions contain dissolved mineral salts under the collective heading of "ash" as well as certain impurities in suspension, such as silicious material and cellulosic material. Broadly speaking, the solutions of the types specified contain two general classes of impurities, this classification being more or less arbitrary, the one classification including the colloidal substances, which include the gums and the pectins, and the coloring and odor-imparting substances, which are largely in solution in the fluids, as distinguished from the gums and pectins which are in a colloidal condition and thus more or less in suspension in such fluids.

We propose to treat such fluids with a complex purifying and filtering medium, preferably of a carbonaceous character, and preferably a carbonaceous purifying and filtering medium derived from leached carbonized lignin residues. Preferably the complex purifying and filtering medium of the present invention comprises several more or less distinct portions or fractions distinguished by their different relative degrees of fineness or their different relative densities, or both by their different relative degrees of fineness and their different densities.

In the case of the carbonaceous purifying and filtering medium known to the trade as "Suchar" and derived from leached carbonized lignin residues, this substance which is described and claimed in a patent of one of the co-inventors herein, John J. Naugle, No. 1,701,272, issued February 5, 1929; will be found to comprise a relatively fine fraction, which will pass through a one hundred and fifty (150) mesh screen and which comprises about one-half (½) of the weight of the carbon itself, and a relatively coarse fraction, which will be retained by a one hundred and fifty (150) mesh screen and which comprises about fifty (50) per cent. of the weight of the carbon itself. There may be an intermediate fraction comprising about ten (10) per cent. of the weight of the carbon and which will pass through a one hundred and twenty-five (125) mesh screen but will all be substantially retained by a one hundred and fifty (150) mesh screen and which is a part of the coarser fraction comprising about fifty (50) per cent. of the weight of the carbon, thus reducing the coarser fraction to about forty (40) per cent. of the weight of the carbon.

Of these three fractions the finest is also generally apparently the lightest, the coarsest being generally apparently the heaviest and the fraction of intermediate fineness being of intermediate apparent density. In each case, due to the fine subdivision of the materials being considered, the densities are rather apparent than real. For example, with reference to the average density of a saccharine fluid, such as a raw sugar melt of average degrees Brix, the first or finest fraction will generally rise to the top of such a melt, the last or coarsest fraction will generally sink to the bottom of such a melt, while the intermediate fraction will, for a time, at least, remain substantially in suspension in such a melt.

Considering now the decolorizing and other purifying properties of these three fractions, and limiting the discussion for the present purposes to the case of the highly activated vegetable carbon derived from leached carbonized lignin residues and known to the trade as "Suchar", the first or finest fraction will have comparatively great attraction for colloidal substances, such as gums and pectins, but little filtering power, while the last or coarsest fraction will have relatively less attraction for colloids, such as gums and pectins, but will have the property of taking up quite a little of the mineral impurities or "ash" content of the fluid and will have considerable filtering power. Both fractions will have considerable attraction for the coloring and odor-imparting impurities present in the fluid, the finer fraction having the greater decolorizing power than the coarser fraction, weight for weight. The intermediate fraction, assuming that the carbon is considered for the purposes of the present discussion to consist of three fractions, will have adsorptive and filtering powers intermediate the adsorptive and filtering powers of the other fractions for the impurities present in the solution. That is, this intermediate fraction will have less adsorptive power for colloids, such as gums and pectins, than the finer fraction, but somewhat more than the coarser fraction, its attraction for the mineral impurities and for the coloring and odor-imparting properties being intermediate that of the two fractions already considered.

Given now such a fluid, such as a saccharine fluid, such as a raw sugar melt of the average degrees Brix and average content of impurities, which, in the case of a washed raw sugar melt of average composition, will be about one (1) per cent. ash and about one (1) per cent. organic impurities, with a content of about three-tenths to four-tenths of one per cent. of invert sugar, and the balance sucrose, these percentages being on the basis of the weights of the sugar solids contained in solution, on adding, say, about one (1) per cent. the weight of Suchar or equivalent carbon to the washed raw sugar melt, this amount being based on the weight of sugar solids contained in the melt, the melt having previously been heated up to about ninety degrees C. (90° C.), or even nearer to the boiling point of water, and having been vigorously stirred after the addition of the designated weight of Suchar, or its equivalent, if now the melt is permitted to come to rest, it will be found that a fraction of the carbon, carrying with it the greater part of the colloidal substances present as impurities in the fluid, comprising particularly the gums and pectins, this fraction constituting the finer or lighter, in this case, apparently, both the finer and lighter portion of such carbon, will rise in a fairly brief period, comprising anywhere from about fifteen (15) minutes to about an hour to the top of the tank or other receptacle in which the saccharine fluid is contained. At the same time, a smaller fraction of the carbon, carrying with it a great part of the mineral impurities present in the fluid, and also, in view of its bulk, a great part of the coloring and odor-imparting impurities present in the fluid, this being the coarser or heavier, in this case, apparently, both the heavier and coarser portion of such carbon, will settle in about fifteen (15) minutes to about an hour, to the bottom of the tank or other receptacle in which the fluid is contained. A third fraction will be found to remain for a considerable time in suspension, this fraction having properties, as to density and fineness of subdivision, as well as with regard to its adsorptive power for the organic and inorganic impurities present in the fluid, intermediate the respective properties of the other two fractions of the carbon already referred to.

The first or lighter fraction, which rises with reasonable quickness to the top of the tank, since it will have adsorbed the colloidal substances, particularly the gums and pectins, which greatly impede filtration, will, by reason of this very fact, have rendered the remaining and greater bulk of the fluid remarkably easy to filter. At the same time, the heavier fraction of the carbon will have taken out of the fluid, due to its bulk, the greater part of the coloring and odor-imparting impurities present in such fluid. The third fraction of intermediate characteristics will still remain in suspension in the intermediate portion of the fluid, with which it may be withdrawn for subsequent purification and filtration.

The principles of the methods of the present invention shall now be more specifically described in connection with the following description of one arrangement of apparatus or equipment which may be used with considerable success in practicing the aforesaid illustrative embodiments of the methods of the present invention and which are more fully described and are fully claimed in our copending application filed of even date herewith and referred to earlier in this specification as being entitled "Means for treating saccharine fluids".

Referring now to the drawing illustrating the aforesaid illustrative arrangement of apparatus or equipment which may be successfully employed for practicing the aforesaid illustrative embodiments of the methods of the present invention, such drawing comprises a more or less diagrammatic view of said arrangement of apparatus or equipment.

Referring now more particularly to the aforesaid arrangement of the apparatus or equipment, and especially to the diagrammatic illustration of such arrangement as shown in the drawing, 10 indicates a mixing tank provided with the mixing or agitating means 11 driven from any suitable source of power not here deemed necessary to be shown, and being also provided with the steam coil 12 or equivalent heating means for heating up to the desired temperature the fluid F initially contained within the mixing tank 10.

We prefer that the fluid F should have added thereto in the mixing tank 10 the desired amount of a subdivided adsorbent purifying and filtering medium, such as the highly activated vegetable carbon derived from leached carbonized lignin residues and known to the trade as "Suchar", this material, as subsequently described in greater detail herein, being of a complex character containing one relatively fine fraction consisting of about fifty per cent. of the weight of the carbon and which fraction will pass through a 150 mesh screen, an intermediate fraction of intermediate fineness comprising about 10 per cent. of the weight of the carbon and which will pass through a 125 mesh screen but will be retained by a 150 mesh screen, and a relatively coarse fraction comprising a considerable part of the carbon or about 40 per cent. of the weight of the carbon and which will be retained by a 125 mesh screen.

The finest major fraction, which is also apparently the lightest, has remarkable adsorbent properties for colloids, particularly for the gums and pectins in the saccharine fluid, such as a washed raw sugar melt, for example, being treated. The coarser or lesser fraction, especially in view of its bulk, will tend to adsorb most of the coloring and odor-imparting impurities of the washed raw sugar melt or other saccharine or other fluid being treated, as well as a great part of the ash or mineral content of such melt, while the intermediate or still lesser fraction will tend to adsorb any impurities freely floating in the bulk of the fluid, the finer portion of apparently the least density rising to the top of the fluid in the mixing tank as a froth, the coarser and apparently heavier fraction settling to the bottom of the mixing tank, while the friction of intermediate fineness and of apparent intermediate density remains suspended for a time, at least, in the bulk or main body of the fluid.

The fluid F, having been heated in the mixing tank 10, and the purifying and filtering medium, such as the Suchar, having been added thereto, with the fluid in such heated condition, in an amount to be chosen as shown by experience and, in the case of a washed raw sugar melt of average purity, equalling from about one-half to about one and one-half per cent. in weight of carbon based on the weight of the sugar solids contained in the washed raw sugar melt, the mixture of fluid and purifying and filtering medium is now rapidly and vigorously stirred or agitated, this stirring or agitation being continued generally for from about 15 minutes to about half an hour, the time being shorter when the fluid is more highly heated and being longer when the fluid is less highly heated.

The vigorously stirred or agitated suspension of the purifying and filtering medium in the fluid F is now led by means of the pipe or other conduit 13 to the settling tank 14 where the suspension of purifying and filtering medium in the fluid F is permitted to settle into a plurality, here three, readily distinguishable and readily separable fractions, as will now be described in considerable detail here. It may here be stated that ordinarily the fluid in the tank 10 is heated to a temperature of from about 80 to about 95° C., generally to about 90 C., although it may be heated to a point shortly below the boiling point of water at 100° C.

The settling tank 14 may be of any desired type or construction provided it has means for withdrawing from the same fractions of fluid and contained purifying and decolorizing medium at different levels of the settling tank. In the present case, we have shown taps or outlets for fluid and contained purifying and filtering medium at no less than six different levels of the settling tank 14. However, four of these taps or outlets are intermediate between the uppermost tap or outlet and the lowermost tap or outlet and empty into a manifold, so that, in a sense, there are only three major taps or outlets for three fractions of fluid containing in suspension therein three separable fraction of purifying and filtering medium.

While various types of settling tanks may be employed for the purposes of the present invention, we prefer to use a settler of the type known as the "Dorr" clarifier or other approved settler. Limiting the present description, for purposes of example merely, to the type of settler known as the "Dorr" type, although other approved types of settlers may be employed with considerable success for the purposes of the present invention, the settler 14 is provided adjacent the top thereof with the froth receiving chamber 15, with which communicates the pipe 13 serving as an outlet for mixed fluid and purifying and filtering medium from the mixing tank 10. The froth receiving tank 15 itself communicates, through its open bottom, with the main body portion 16 of the settler 14. The froth receiving chamber 15, which receives the lightest fraction of fluid and contained purifying and filtering medium, which latter carries with it the greater part of the gums, pectins and other colloids which impede filtration, communicates by means of the discharge pipe 17 with the filtering unit 30 shortly to be described.

Passing through the center of the settler 14 is a shaft 18 driven from any suitable source of power not here deemed necessary to be shown and carrying the four sets or groups of spaced arms or scrapers 19a, 19b, 19c and 19d, there being four sets of such scrapers, as shown, the scrapers being angularly mounted on the shaft 18. The four sets of scrapers 19a, 19b, 19c and 19d cooperate with the similarly inclined substantially frusto-conical shelves 20a, 20b, 20c and 20d which have the central openings 21a, 21b, 21c and 21d. It may here be stated that the openings 21a, 21b, 21c and 21d are large enough to permit ample clearance for the shaft 18 and to permit the seepage of sludge and liquid, the sludge gradually seeping down along the shaft 18 to be collected in the bottom of the tank, as will shortly be described in considerable detail herein, while substantially clarified liquid gathers in the spaces 16a, 16b, 16c and 16d, whence it is withdrawn by means of the taps or outlets 23a, 23b, 23c and 23d, respectively.

It may be here stated that the fractions of liquid contained in the portions 16a, 16b, 16c and 16d of the settling tank 14 constitute the intermediate fraction of the fluid containing a part of the purifying and filtering medium in suspension therein, this fraction being intermediate the froth accumulated in the froth receiving chamber 15 and the settlings accumulated in the lowermost portion of the settling tank 14, as will shortly be described in considerable detail herein.

The four taps or outlets 23a, 23b, 23c and 23d, receiving portions of the intermediate fraction of fluid and suspended purifying and filtering medium, empty into the manifold tank 24 where such fractions of fluid are mingled and whence they are withdrawn by means of the pipe or other conduit 25, all to be received by the filtering unit 40 to be described in detail subsequently in this specification.

The major portion of the Suchar or other purifying and filtering medium is received as a sludge, together with the lowermost fraction of the fluid in the settling tank 14, in the settlings receiver 26 constituting a portion of the settling tank 14 and communicating openly therewith. For this purpose, the bottom 14' of the settling tank 14 is provided with the outlet 14'' which communicates directly with the settlings receiving tank 26. From the settlings receiving tank 26 a pipe or other conduit 27 communicates by way of pump 28 with the filtering unit 50 which will be described in considerable detail hereinafter. It may here be stated that in each of the pipes or conduits 13, 17, 25 and 27, suitable pumps or other means may be installed for the required circulation of the fluids, as well as in other portions of the apparatus. Certain pumps or other suitable apparatus may likewise be installed for giving to the fractions or portions of fluid passing through the respective pipes or conduits the necessary flow into other parts of the system, as desired.

Communicating with the settling tank 14 at different levels thereof, as by way of the pipes or conduits 17, 25 and 27 communicating respectively with the uppermost, intermediate and the lowermost levels or fractions of fluid in the settling tank 14, are a plurality of independent or independently regulatable and controllable filtering units, one being preferably used for each level or fraction of fluid in the settling tank 14. Accordingly, since, in the example here being described, there are three such main levels or fractions of fluid in the settling tank 14, we prefer to use three independent or independently regulatable or controllable filtering units respectively designated by the reference characters 30, 40 and 50.

Referring now to these filtering units we prefer that such filtering units, connected to the settling tank 14 at different levels for treating different fractions of fluid contained in such settling tank, shall be of the vacuum filter type, although different types and constructions of filtering units may be used with considerable success in accordance with the principles of the present invention. For example, and describing now more particularly the filtering units designated by reference characters 30 and 40, each of said filtering units comprises the imperforate sides 31 and 41, respectively, each unit having two such sides and the sides being preferably substantially circular in form. The peripheral edges 32 and 42, respectively, are foraminous or perforate and it is through such foraminous or perforate lateral or circumferential sides that filtrate is drawn into the interior of the drums 33 and 43, respectively, made up of the respective imperforate sides and perforate lateral or circumferential walls.

Each of the drums 33 and 43 dips or extends into the respective tanks 34 and 44. Communicating with the interior of each of the drums 33 and 43 are the hollow shafts 33' and 43' respectively, about which the respective drums 33 and 43 may be rotated from any suitable source of power not here deemed necessary to be shown. The hollow shafts 33' and 43', communicating with the interior of the respective drums 33 and 43, provide outlets for the discharge of comparatively pure filtrate from the respective filtering units, these hollow shafts, in the case where the various fractions of relatively pure filtrate are desired to be commingled or mixed together, communicating with a manifold outlet pipe 60 leading to the tanks for clear filtrate and thence to the evaporating pans, as desired, in the case where the fluid being treated consists of a washed raw sugar melt, for example.

Communicating with the tanks 34 and 44 adjacent the tops thereof are the respective overflow pipes 34' and 44' leading to the respective carbon tanks 34'' and 44''. The carbon tanks are provided in order to provide a circulating system within the respective tanks 34 and 44, into which system may be introduced, if desired, an increment or additional amount of fresh or virgin carbon or relatively active and unspent carbon where, as may often happen, especially in the case of the top and intermediate fractions of the fluid being purified, the amount of subdivided purifying and filtering medium contained therein is not sufficient to provide by itself a sufficiently thick and compact filtering layer or cake to carry out the filtering operation to enable relatively pure filtrate to be readily separated from the particular fractions of fluid.

For this purpose, the carbon tanks 34'' and 44'' may be provided with the respective stirring or agitating means 35 and 45 driven from any suitable source of power not here deemed necessary to be shown. Likewise communicating with the bottom of the carbon tanks 34'' and 44'' are the outlet pipes or other conduits 35' and 45' respectively communicating with the respective tanks 34 and 44 by way of the circulating pumps 35'' and 45'', respectively. It will thus be seen that a closed circulating system for the efficient use of additional increments of fresh or virgin carbon or of relatively unspent and active carbon is provided for each of the filter units 30 and 40.

At 36 and 46 we have indicated scrapers which serve to maintain the layers or cakes of carbon on the rotating drums 33 and 43, respectively, so as to be of substantially uniform thickness and porosity so that a substantially constant rate of filtration is maintained through the perforate circumferential walls 32 and 42 of the respective rotating drums 33 and 43. It will be apparent that this cake is built up as each drum rotates, pure filtrate being sucked into the interior of each drum through the perforations of its perforate circumferential wall and through the initial layer of filtering material which gradually builds up on the perforate circumferential wall of each rotating drum as it rotates until its maximum thickness, determined by the position of the scraper with respect to the layer or cake of filtering material on the perforate circumferential wall, is reached.

Suction is provided for the hollow shafts communicating with the interior of each of the drums by any suitable suction pump installed at some convenient point in the main outlet pipe or conduit 60, such pump not being here deemed necessary to be shown. The portions of spent carbon 36' and 46', being continually removed from the layers or cakes of carbon on the filtering units 30 and 40, respectively, may be sent either to the revivifiers, such portions being sent to the revivifiers either separately or collectively, as desired, which may be accomplished by means of the portions 37' and 47' of the adjustable chutes 37 and 47, respectively, having the additional chute portions 37'' and 47'' which, by the relative adjustment of the chute portions 37' and 37'' of the chute 37 and the relative adjustment of the corresponding adjustable chute portions 47' and 47'' of the chute 47, serve to send the increments of spent carbon to the revivifiers, of which there may be one or more, depending on whether the carbon portions are to be separately or collectively revivified and which are not here deemed necessary to be shown. Or a part of the carbon, if still unspent, or if otherwise desired to be used in this way, may be returned to the respective carbon tanks 34'' and 44'' for further use in the system in which it is circulated by means of the respective circulating pumps 35'' and 45''. This latter situation arises more particularly where increments of fresh or virgin carbon, or relatively unspent or active carbon, are added to either or both of the tanks 34 and 44 for the reasons already suggested earlier in this specification.

The remaining filtering unit 50 likewise comprises the two imperforate and substantially circular side walls 51 and the lateral or circumferential perforate or foraminous wall 52 making up the drum 53. There is also provided the hollow shaft 53' about which the drum 53 rotates, driven by any suitable source of power not deemed necessary here to be shown. The hollow shaft 53' communicates with the interior of the drum 53 and likewise connects with the manifold outlet pipe 60 which leads to the tanks for the melt and thence to the evaporating pans in the case where, by way of example, a washed raw sugar melt is the fluid being treated in the apparatus of the present invention. The rotating drum 53 dips into the settlings tank 54 which communicates, adjacent its upper portion, with the settlings conduit 27.

Since the tank 54 receives the major portion of the sludge or settlings comprising the greater portion of the spent Suchar or other purifying and filtering medium, it is ordinarily not necessary to add further increments of fresh or virgin carbon or of relatively unspent and active carbon to the tank 54 in order to form a layer or cake of filtering medium of sufficient thickness. We have, therefore, omitted the overflow pipe, carbon tank, circulating pump and carbon chute shown in connection with the other filtering units. 55 indicates a scraper so positioned as to permit a layer or cake of filtering medium to be built up of a predetermined thickness and predetermined porosity so as to permit a predetermined rate of flow of filtrate, increments or portions of the unspent filtering medium being removed by the scraper continually and thence sent to the revivifier.

In no case has the revivifier been shown, it being sufficient to state that the revivifier is of the type using electrical current, which is passed directly through the spent Suchar, after the same has been dried, the spent carbon being heated to a temperature sufficient to carbonize and thereafter burn away the organic impurities picked up by the Suchar during its use for purifying the fluid being treated. This temperature, which is generally between from about 350° C. and about 450° C., is sufficient to burn away such carbonized impurities but not sufficient to substantially consume the Suchar which is in a semi-graphitic condition as a result of its process of manufacture. The revivified carbon may first be given a dilute acid wash to remove the mineral impurities therein, and then may be washed with pure wash waters, after which it may be dried and used over again as often as desired. One form of revivifying apparatus which may be used with considerable success for this purpose is shown and described in the copending application of John J. Naugle, one of the co-inventors herein, filed April 2, 1923, bearing Serial No. 633,640, and entitled "Method of treating carbonaceous material in an electric furnace or the like."

The mode of operation of the aforesaid illustrative arrangement of apparatus or equipment, suitable for successfully practicing the aforesaid illustrative embodiments of the methods of the present invention, has, it is believed, been made sufficiently clear in the foregoing description but may be briefly summarized as follows: Fluid, such as saccharine fluid, for example sugar juices, sugar melts, affinations or other "run-offs," syrups or molasses, for example a washed raw sugar melt, is admitted to the mixing tank 10 where it is heated up to from about 80 to about 95° C., as to about 90° C., or even higher, short of the boiling point of water, and then a predetermined amount of purifying and filtering medium, such as Suchar, in an amount equal to about one-half to about one and one-half per cent., such as one per cent., based on the weight of the sugar solids contained in the fluid, is now added to the fluid in the mixing tank 10, after which the stirring or agitating means 11 are set in operation for a period of from about 15 minutes to about half an hour, more or less, until maximum adsorption of impurities has taken place.

The mixture of fluid and suspended Suchar or equivalent purifying and filtering medium is now sent to the settling tank 14 where separation or segregation of three fractions of the Suchar or equivalent purifying and filtering medium in three respective fractions of fluid now takes place. The first or topmost fraction will consist of a froth containing the finest and apparently lightest although largest fraction of the carbon containing a greater portion of the adsorbed colloids, such as gums and pectins, for which this fraction of the carbon appears to have a selective or preferential adsorptive power. The lowermost fraction of carbon will comprise the coarsest and apparently heaviest fraction of the carbon and will comprise also the next largest part of the bulk of the carbon and contain, in view of such bulk, the greater portion of the coloring and odor-imparting impurities present in the fluid, although its decolorizing power, weight for weight, is less than that of the finer and apparently lighter fraction of the carbon which rises to the top of the fluid. The second batch of fluid will contain, in suspension therein, the fraction of the carbon of intermediate fineness of subdivision and of intermediate apparent density.

The three fractions of fluid containing the three respective fractions of carbon, as defined above, are now led to their respective filtering units, the top fraction or froth being led to the tank 34 of the filtering unit 30, the intermediate fraction or suspension being sent to the tank 44 of the filtering unit 40, and the lowermost fraction or settlings being sent to the tank 54 of the filtering unit 50.

Here the separate fractions are separately treated under optimum conditions for the most expeditious and economical recovery both of the fractions of substantially pure filtrate and the fractions of spent carbon. That is, in the filtering unit 30 additional fractions or increments of fresh or virgin carbon or of relatively unspent and active carbon may be added to the tank 34 or the carbon tank 34″ where the suspension is agitated and circulated until the carbon is all spent, substantially pure filtrate being meanwhile withdraw through the hollow shaft 33′ and spent carbon being sent to the revivifier by means of the chute portion 37′ of the chute 37, the chute portion 37″ of the chute 37 being used to return fractions of carbon to the carbon tank 34″ before the carbon is entirely spent.

In a similar manner, in connection with the filtering unit 40, increments of fresh or virgin carbon, or of relatively unspent and active carbon, may be added to the tank 44 or to the carbon tank 44'' where the mixture is stirred and circulated, in the same manner as for the carbon tank 34'', after which substantially pure filtrate is withdrawn through the hollow shaft 43', the spent carbon being sent to the revivifier by means of the chute portion 47' of the chute 47, while increments of unspent carbon may be sent by means of the chute section 47'' back to the carbon tank 44'', there to be filtered and used until the carbon is exhausted, when it is sent to the revivifier. Similarly, the filtering unit 50 receives the settlings fraction in the tank 54, substantially pure filtrate being withdrawn by means of the hollow shaft 53' and increments of unspent carbon being sent to the revivifier by means of the scraper 55, no additional fresh or virgin carbon or relatively unspent or active carbon being ordinarily needed for this filtering unit in view of the comparatively large bulk of the spent carbon contained in the settlings. In each case substantially pure filtrate is drawn off through the hollow shafts 33', 43' and 53' by means of the suction applied to the main fluid outlet or conduit 60.

The filtrate withdrawn either collectively or separately from the various filtering units may now be either collectively or separately sent to the filtrate tanks or other suitable fluid tank, after which the filtrate may be sent in one or more batches to the evaporating pans in the case where a washed raw sugar melt, for example, is the fluid treated in the apparatus described above. The filtrate is characterized by its brilliancy, its remarkable purity, and the numerous strikes of granulated sugar which may be obtained directly therefrom, amounting often to as many as five strikes of granulated sugar in the case where the fluid being purified consists of a washed raw sugar melt of average density, and in the case where the subdivided purifying and filtering medium consists of Suchar in an amount equal to about one per cent. of the weight of the sugar solids contained in the washed raw sugar melt being treated.

The fractions of spent carbon may now be sent either collectively or separately to one or more revivifiers. Ordinarily it will be sufficient to mingle the fractions of spent carbon and send them collectively to the revivifier, such as the revivifier described in the copending application of John J. Naugle referred to above. On the other hand, it may be desirable and preferable in certain cases to treat the fractions of spent carbon separately, observing partciular conditions as to current densities, temperatures, and rates of admission of activating gases or other reagents, such as air in regulated quantities, or steam in regulated quantities, or both of these agencies, to the reaction chamber within the revivifier. In each case the exact temperature, within the usual range of from about 350 to about 450° C., and the amounts if any of activating reagents to be admitted to the heating chamber within the revivifier, may be readily determined by trial and experiment depending upon the character of the fraction of the carbon and the character of the organic or other impurities accumulated by the carbon during its use. Finally, the washing with acidulated water and subsequently with pure wash waters to remove the soluble ash content of the revivifier carbon will likewise depend upon the character of the fraction being treated, as may be readily determined by trial and experiment.

The result is a revivified carbon or revivified fractions of carbon which may be used over and over again, either separately or blended together to reproduce substantially the composition of the fresh or virgin carbon. These fractions of the blended carbon itself will be found to be practically as highly activated as the original fresh or virgin carbon, the impurities, both organic and inorganic, having been burnt away in the former instance, and removed by the washing process in the latter instance. It may here be stated that the three fractions of carbon are in a sense separate entities, although found blended together in the original fresh or virgin Suchar carbon, or they may be separately prepared and afterwards blended together to form the complex Suchar or equivalent fractionable or separable purifying and filtering carbon.

The advantages of the aforesaid illustrative embodiments of the methods of the present invention are numerous and of great practical importance. The methods of the present invention are simple to practice, require simple apparatus for their practice, and permit numerous simplifications and economies in the necessary operations to be readily effected. Such methods also permit a very efficient treatment of the fluids to be treated in accordance therewith and an equally efficient use of the purifying materials employed, with a view to their most effective treatment of the particular class or classes of impurities contained in the fluids being treated, all with a view to purifying such fluids by the use of a purifying agent in subdivided form which is adapted also to serve as a filtering medium.

Where the methods of the present invention are applied to the treatment of saccharine fluids, such as sugar juices, sugar melts, affinations and other "run-offs", syrups and molasses, to decolorize and otherwise purify the same either partially or completely, especially by the use of a "complex" decolorizing and filtering or like purifying medium in subdivided form, such as the highly activated vegetable carbon known to the trade as "Suchar", it is possible to obtain remarkably high rates of filtration in the production of filtrates of remarkably high purity and brilliancy. The several fractions of Suchar or equivalent purifying and filtering medium may either be separately revivified, which in some cases is highly desirable in view of the different treatment which should be accorded the different fractions as a result of the different types of impurities which they have picked up during the treating process, or they may be collectively sent to the revivifier.

The bottom or apparently heaviest fraction of the carbon will be found to be high in ash and to be capable of permitting a very high rate of filtration. The top fraction or froth, which has adsorbed most of the colloids present in the solution, such as the gums, pectins and other colloids present in the saccharine fluids of the types referred to above, and which is apparently the lightest fraction, will be found to possess a relatively low rate of filtration in view of the presence of such adsorbed colloids in the carbon or equivalent fraction. On the other hand, the middle fraction of carbon or equivalent material, which is apparently the fraction of intermediate density, will likewise be found to permit a high rate of filtration. This intermediate or middle fraction of carbon or equivalent material may be added either to the bottom fraction, or to the top fraction, preferably to the top fraction, to increase the rate of the filtration of the same.

It may here be stated that the rates of filtration through the bottom fraction of carbon are sometimes three or four times as high as the rates of filtration through the complex mass of carbon where the fractionation or separation of the carbon is not permitted to take place, in other words, where the whole mass of carbon is treated as a single unitary filtering agent. In certain cases, while the carbon fractions may be permitted to separate during the process of adsorbing their particular classes or types of impurities, and where, thereafter, the entire mass of fluid containing the various carbon fractions is filtered as a whole, with the bottom or apparently heaviest fraction of carbon deposited first on the filter bags or other foraminous filtering fabric, and the middle fraction or fraction of apparent intermediate density thereafter deposited on the initial layer comprising the bottom fraction, after which, finally, the top fraction is deposited on the middle fraction, which previously has been deposited on the bottom fraction, rates of filtration running as high as from about thirty-seven to about forty gallons per square foot of filtering surface per hour, or from about seven to about ten times the maximum rates of filtration hitherto ordinarily obtainable, are rendered possible.

These remarkably high rates of filtration, combined with the high purity and brilliancy of the filtrates, in the case of the saccharine fluids referred to above, constitute additional advantages of the methods of the present invention of great theoretical and practical importance. Other advantages and superiorities of the methods of the present invention will readily occur to those skilled in the art to which the same relates. It may here be stated that the saccharine fluid may be heated after the subdivided purifying and filtering material has been added thereto as well as before such material has been added to the fluid.

What we claim as our invention is:

1. The method of treating a fluid having two or more types of impurities therein, which comprises adding to such a fluid subdivided carbonaceous adsorbent material of varied degrees of fineness one portion of which adsorbs one type of such impurities and another portion of which adsorbs another type of such impurities.

2. The method of treating a fluid having two or more types of impurities therein, which comprises adding to such a fluid subdivided carbonaceous adsorbent material of varied degrees of fineness derived from leached, carbonized lignin residues, one portion of which adsorbs one type of such impurities and another portion of which adsorbs another type of such impurities.

3. The method of treating a fluid having two or more types of impurities therein, which comprises adding to such a fluid subdivided carbonaceous adsorbent material of varied degrees of fineness derived from leached, carbonized lignin residues, one portion of which adsorbs one type of such impurities and another portion of which adsorbs another type of such impurities, the density of said fluid being such that one portion of said adsorbent material with its adsorbed impurities will tend to rise up through said fluid.

4. The method of treating a fluid having two or more types of impurities therein, which comprises adding to such a fluid subdivided carbonaceous adsorbent material of varied degrees of fineness one portion of which adsorbs one type of such impurities and another portion of which adsorbs another type of such impurities, the density of said fluid being such that one portion of said adsorbent material with its adsorbed impurities will tend to rise up through said fluid.

5. The method of treating a fluid having two or more types of impurities therein, which comprises adding to such a fluid subdivided adsorbent material of varied degrees of fineness one portion of which adsorbs one type of such impurities and another portion of which adsorbs another type of such impurities, the density of said fluid being such that one portion of said adsorbent material with its adsorbed impurities will tend to rise up through said fluid.

6. The method of treating a fluid having two or more types of impurities therein, which comprises adding to such a fluid subdivide carbonaceous adsorbent material of varied degrees of fineness derived from leached, carbonized lignin residues, one portion of which adsorbs one type of such impurities and another portion of which adsorbs another type of such impurities, the density of said fluid being such that one portion of said adsorbent material with its adsorbed impurities will tend to settle down through said fluid.

7. The method of treating a fluid having two or more types of impurities therein, which comprises adding to such a fluid subdivided carbonaceous adsorbent material of varied degrees of fineness one portion of which adsorbs one type of such impurities and another portion of which adsorbs another type of such impurities, the density of said fluid being such that one portion of said adsorbent material with its adsorbed impurities will tend to settle down through said fluid.

8. The method of treating a fluid having two or more types of impurities therein, which comprises adding to such a fluid subdivided carbonaceous adsorbent material of varied degrees of fineness derived from leached, carbonized lignin residues, one portion of which adsorbs one type of such impurities and another portion of which adsorbs another type of such impurities, the density of said fluid being such that one portion of said adsorbent material with its adsorbed impurities will tend to be suspended in said fluid.

9. The method of treating a fluid having two or more types of impurities therein, which comprises adding to such a fluid subdivided carbonaceous adsorbent material of varied degrees of fineness one portion of which adsorbs one type of such impurities and another portion of which adsorbs another type of such impurities, the density of said fluid being such that one portion of said adsorbent material with its adsorbed impurities will tend to be suspended in said fluid.

10. The method of purifying a fluid which comprises adding thereto a subdivided adsorbent material of varied degrees of fineness one fraction of which will adsorb one type of the impurities in said fluid and will tend to settle down through said fluid while another fraction of said adsorbent material will adsorb another type of said impurities and will tend to rise up through said fluid.

11. The method of purifying a fluid which comprises adding thereto a subdivided carbonaceous adsorbent material of varied degrees of fineness one fraction of which will adsorb one type of the impurities in said fluid and will tend to settle down through said fluid while another fraction of said adsorbent material will adsorb another type of said impurities and will tend to rise up through said fluid.

12. The method of purifying a fluid which comprises adding thereto a subdivided carbonaceous adsorbent material of varied degrees of fineness derived from leached, carbonized lignin residues, one fraction of which will adsorb one type of the impurities in said fluid and will tend to settle down through said fluid while another fraction of said adsorbent material will adsorb another type of said impurities and will tend to rise up through said fluid.

13. The method of treating a fluid having two or more types of impurities therein, which comprises adding to such a fluid subdivided adsorbent material of varied degrees of fineness one portion of which adsorbs one type of such impurities and another portion of which adsorbs another type of much impurities, stirring said fluid and contained adsorbent material with such fluid heated to a temperature of about 90° C., and thereafter separately withdrawing and separately treating fractions of such fluid containing the respective types of said adsorbent material and adsorbed impurities.

14. The method of treating a fluid having two or more types of impurities therein, which comprises adding to such a fluid subdivided carbonaceous adsorbent material of varied degrees of fineness derived from leached, carbonized lignin residues, one portion of which adsorbs one type of such impurities and another portion of which adsorbs another type of such impurities, stirring said fluid and contained adsorbent material with such fluid heated to a temperature of about 90° C., and thereafter separately withdrawing and separately treating fractions of such fluid containing the respective portions of said adsorbent material and adsorbent impurities.

15. The method of treating a fluid having two or more types of impurities therein, which comprises adding to such a fluid subdivided carbonaceous adsorbent material of varied degrees of fineness one portion of which substantially selectively adsorbs one type of such impurities and another portion of which substantially selectively adsorbs another type of such impurities, stirring said fluid and contained adsorbent material with such fluid heated to a temperature of about 90° C., and thereafter separately withdrawing and separately treating fractions of such fluid containing the respective portions of said adsorbent material and adsorbed impurities.

16. The method of purifying a fluid which comprises adding thereto a subdivided carbonaceous adsorbent material of varied degrees of fineness derived from leached, carbonized lignin residues, one fraction of which will adsorb one type of the impurities in said fluid and will tend to rise up through said fluid while another fraction of said adsorbent material will adsorb another type of said impurities and will tend to settle down through said fluid, and heating and stirring said fluid and contained adsorbent material to cause said fractions of said adsorbent material to adsorb said respective types of said impurities.

17. The method of purifying a fluid which comprises adding thereto a subdivided carbonaceous adsorbent material of varied degrees of fineness one fraction of which will adsorb one portion of the impurities in said fluid and will tend to settle down through said fluid while another fraction of said adsorbent material will adsorb another portion of said impurities and will tend to rise up through said fluid, and heating and stirring said fluid and contained adsorbent material to cause said fractions of said adsorbent material to adsorb said respective portions of said impurities.

18. The method of purifying a fluid which comprises adding thereto a subdivided adsorbent material of varied degrees of fineness one fraction of which will adsorb one type of the impurities in said fluid and will tend to settle down through said fluid while another fraction of said adsorbent material will adsorb another type of said impurities and will tend to rise up through said fluid, and heating and stirring said fluid and contained adsorbent material to cause said fractions of said adsorbent material to adsorb said respective types of said impurities.

19. The method of treating a fluid having two or more types of impurities therein, which comprises adding to such a fluid subdivided carbonaceous adsorbent material of varied degrees of fineness derived from leached, carbonized lignin residues, one portion of which adsorbs one type of such impurities and another portion of which adsorbs another type of such impurities, stirring said fluid and contained adsorbent material with such fluid heated to a temperature of about 90° C., and separately withdrawing and separately treating fractions of such fluid containing the respective portions of said adsorbent material and adsorbed impurities to remove said respective portions of said adsorbent material from the respective fractions of said fluid.

20. The method of treating a fluid having two or more types of impurities therein, which comprises adding to such a fluid subdivided carbonaceous adsorbent material of varied degrees of fineness one portion of which adsorbs one type of such impurities and another portion of which adsorbs another type of such impurities, stirring said fluid and contained adsorbent material with such fluid heated to a temperature of about 90° C., and separately withdrawing and separately treating fractions of such fluid containing the respective portions of said adsorbent material and adsorbed impurities to remove said respective portions of said adsorbent material from the respective fractions of said fluid.

21. The method of treating a fluid having two or more types of impurities therein, which comprises adding to such a fluid subdivided adsorbent material of varied degrees of fineness one portion of which adsorbs one type of such impurities and another portion of which adsorbs another type of such impurities, stirring said fluid and contained adsorbent material with such fluid heated to a temperature of about 90 degrees C., and separately withdrawing and separately treating fractions of such fluid containing the respective portions of said adsorbent material and adsorbed impurities to remove said respective portions of said adsorbent material from the respective fractions of said fluid.

22. The method of purifying a fluid which comprises adding thereto a subdivided carbonaceous adsorbent material of varied degrees of fineness derived from leached, carbonized lignin residues, one fraction of which will adsorb one type of the impurities in said fluid and will tend to settle down through said fluid while another fraction of said adsorbent material will adsorb another type of said impurities and will tend to rise up through said fluid, heating and stirring said fluid and contained adsorbent material to cause said fractions of said adsorbent material to adsorb said respective types of said impurities, and thereafter separately withdrawing and separately treating fractions of such fluid containing the respective types of said adsorbent material and adsorbed impurities.

23. The method of purifying a fluid which comprises adding thereto a subdivided carbonaceous adsorbent material of varied degrees of fineness one fraction of which will adsorb one type of the impurities in said fluid and will tend to rise up through said fluid while another fraction of said adsorbent material will adsorb another type of said impurities and will tend to settle down through said fluid, heating and stirring said fluid and contained adsorbent material to cause said fractions of said adsorbent material to adsorb said respective types of said impurities, and thereafter separately withdrawing and separately treating fractions of such fluid containing the respective types of said adsorbent material and adsorbed impurities.

24. The method of purifying a fluid which comprises adding thereto a subdivided adsorbent material of varied degrees of fineness one fraction of which will adsorb one type of the impurities in said fluid and will tend to rise up through said fluid while another fraction of said adsorbent material will adsorb another type of said impurities and will tend to settle down through said fluid, heating and stirring said fluid and contained adsorbent material to cause said fractions of said adsorbent material to adsorb said respective types of said impurities, and thereafter separately withdrawing and separately treating fractions of such fluid containing the respective types of said adsorbent material and adsorbed impurities.

25. The method of purifying a fluid which comprises adding thereto a subdivided carbonaceous adsorbent material of varied degrees of fineness one fraction of which will adsorb one type of the impurities in said fluid and will tend to settle down through said fluid while another fraction of said adsorbent material will adsorb another type of said impurities and will tend to rise up through said fluid, heating and stirring said fluid and contained adsorbent material to cause said fractions of said adsorbent material to adsorb said respective types of said impurities, and separately withdrawing and separately treating fractions of such fluid containing the respective portions of said adsorbent material and adsorbed impurities to remove said respective types of said adsorbent material from the respective fractions of said fluid.

26. The method of purifying a fluid which comprises adding thereto a subdivided carbonaceous adsorbent material of varied degrees of fineness derived from leached, carbonized lignin residues, one fraction of which will adsorb one type of the impurities in said fluid and will tend to settle down through said fluid while another fraction of said adsorbent material will adsorb another type of said impurities and will tend to rise up through said fluid, heating and stirring said fluid and contained adsorbent material to cause said fractions of said adsorbent material to adsorb said respective types of said impurities, and separately withdrawing and separately treating fractions of such fluid containing the respective types of said adsorbent material and adsorbed impurities to remove said respective types of said adsorbent material from the respective fractions of said fluid.

27. The method of purifying a fluid which comprises adding thereto a subdivided adsorbent material of varied degrees of fineness one fraction of which will adsorb one type of the impurities in said fluid and will tend to settle down through said fluid while another fraction of said adsorbent material will adsorb another type of said impurities and will tend to rise up through said fluid, heating and stirring said fluid and contained adsorbent material to cause said fractions of said adsorbent material to adsorb said respective types of said impurities, and separately withdrawing and separately treating fractions of such fluid containing the respective types of said adsorbent material and adsorbed impurities to remove said respective portions of said adsorbent material from the respective fractions of said fluid.

28. The method of decolorizing and filtering saccharine fluids, such as sugar melts, affinations and other "run-offs", syrups and molasses, which comprises stirring such a fluid while the same has suspended therein a subdivided decolorizing and filtering medium of varied degrees of fineness, and thereafter permitting said fluid to settle, said fluid having such a density and the impurities thereof being such that a fraction of said decolorizing and filtering medium and its accumulated impurities will rise up through said fluid while another fraction of said decolorizing and filtering medium and its accumulated impurities will settle down through said fluid.

29. The method of decolorizing and filtering saccharine fluids, such as sugar melts, affinations and other "run-offs", syrups and molasses, which comprises stirring such a fluid while the same has suspended therein a subdivided decolorizing and filtering medium of varied degrees of fineness, and thereafter permitting said fluid to settle, said fluid having such a density and the impurities thereof being such that a fraction of said decolorizing and filtering medium and its accumulated impurities will rise up through said fluid while another fraction of said decolorizing and filtering medium and its accumulated impurities will settle down through said fluid, a third fraction of said decolorizing and filtering medium and its accumulated impurities remaining substantially in suspension in said fluid.

30. The method of decolorizing and filtering saccharine fluids, such as sugar melts, affinations and other "run-offs", syrups and molasses, which comprises stirring such a fluid while the same has suspended therein a subdivided carbonaceous decolorizing and filtering medium, of varied degrees of fineness, and thereafter permitting said fluid to settle, said fluid having such a density and the impurities thereof being such that a fraction of said decolorizing and filtering medium and its accumulated impurities will rise up through said fluid while another fraction of said decolorizing and filtering medium and its accumulated impurities will settle down through said fluid, a third fraction of said decolorizing and filtering medium and its accumulated impurities remaining substantially in suspension in said fluid.

31. The method of decolorizing and filtering saccharine fluids, such as sugar melts, affinations and other "run-offs", syrups and molasses, which comprises stirring such a fluid while the same has suspended therein a subdivided carbonaceous decolorizing and filtering medium of varied degrees of fineness derived from leached, carbonized lignin residues, and thereafter permitting said fluid to settle, said fluid having such a density and the impurities thereof being such that a fraction of said decolorizing and filtering medium and its accumulated impurities will rise up through said fluid while another fraction of said decolorizing and filtering medium and its accumulated impurities will settle down through said fluid.

32. The method of decolorizing and filtering saccharine fluids, such as sugar melts, affinations and other "run-offs", syrups and molasses, which comprises stirring such a fluid while the same has suspended therein a subdivided carbonaceous decolorizing and filtering medium of varied degrees of fineness derived from leached, carbonized lignin residues, and thereafter permitting said fluid to settle, said fluid having such a density and the impurities thereof being such that a fraction of said decolorizing and filtering medium and its accumulated impurities will rise up through said fluid while another fraction of said decolorizing and filtering medium and its accumulated impurities will settle down through said fluid, a third fraction of said decolorizing and filtering medium and its accumulated impurities remaining substantially in suspension in said fluid.

33. The method of decolorizing and filtering saccharine fluids, such as sugar melts, affinations and other "run-offs", syrups and molasses, which comprises stirring such a fluid while the same has suspended therein a subdivided carbonaceous decolorizing and filtering medium of varied degrees of fineness derived from leached, carbonized lignin residues, permitting said fluid to settle, said fluid having such a density and the impurities thereof being such that a fraction of said decolorizing and filtering medium and its accumulated impurities will rise up through said fluid while another fraction of said decolorizing and filtering medium and its accumulated impurities will settle down through said fluid, and thereafter separately withdrawing each of said respective fractions of decolorizing and filtering medium and its accumulated impurities in a portion of said fluid.

34. The method of decolorizing and filtering saccharine fluids, such as sugar melts, affinations and other "run-offs", syrups and molasses, which comprises stirring such a fluid while the same has suspended therein a subdivided carbonaceous decolorizing and filtering medium of varied degrees of fineness, permitting said fluid to settle, said fluid having such a density and the impurities thereof being such that a fraction of said decolorizing and filtering medium and its accumulated impurities will rise up through said fluid while another fraction of said decolorizing and filtering medium and its accumulated impurities will settle down through said fluid, and thereafter separately withdrawing each of said respective fractions of decolorizing and filtering medium and its accumulated impurities in a portion of said fluid.

35. The method of decolorizing and filtering saccharine fluids, such as sugar melts, affinations and other "run-offs", syrups and molasses, which comprises stirring such a fluid while the same has suspended therein a subdivided carbonaceous decolorizing and filtering medium of varied degrees of fineness derived from leached, carbonized lignin residues, permitting said fluid to settle, said fluid having such a density and the impurities thereof being such that a fraction of said decolorizing and filtering medium and its accumulated impurities will rise up through said fluid while another fraction of said decolorizing and filtering medium and its accumulated impurities will settle down through said fluid, a third fraction of said decolorizing and filtering medium and its accumulated impurities remaining substantially in suspension in said fluid, and thereafter separately withdrawing each of said respective fractions of decolorizing and filtering medium and its accumulated impurities in a portion of said fluid.

36. The method of decolorizing and filtering saccharine fluids, such as sugar melts, affinations and other "run-offs, syrups and molasses, which comprises stirring such a fluid while the same has suspended therein a subdivided carbonaceous decolorizing and filtering medium of various degrees of fineness, permitting said fluid to settle, said fluid having such a density and the impurities thereof being such that a fraction of said decolorizing and filtering medium and its accumulated impurities will rise up through said fluid while another fraction of said decolorizing and filtering medium and its accumulated impurities will settle down through said fluid, a third fraction of said decolorizing and filtering medium and its accumulated impurities remaining substantially in suspension in said fluid, and thereafter separately withdrawing each of said respective fractions of decolorizing and filtering medium and its accumulated impurities in a portion of said fluid.

37. The method of decolorizing and filtering saccharine fluids, such as sugar melts, affinations and other "run-offs," syrups and molasses, which comprises stirring such a fluid while the same has suspended therein a subdivided decolorizing and filtering medium of varied degrees of fineness, permitting said fluid to settle, said fluid having such a density and the impurities thereof being such that a fraction of said decolorizing and filtering medium and its accumulated impurities will rise up through said fluid while another fraction of said decolorizing and filtering medium and its accumulated impurities will settle down through said fluid, a third fraction of said decolorizing and filtering medium and its accumulated impurities remaining substantially in suspension in said fluid, and thereafter separately withdrawing each of said respective fractions of decolorizing and filtering medium and its accumulated impurities in a portion of said fluid.

38. The method of decolorizing and filtering saccharine fluids, such as sugar melts, affinations and other "run-offs," syrups and molasses, which comprises stirring such a fluid while the same has suspended therein a subdivided decolorizing and filtering medium of varied degrees of fineness, permitting said fluid to settle, said fluid having such a density and the impurities thereof being such that a fraction of said decolorizing and filtering medium and its accumulated impurities will rise up through said fluid while another fraction of said decolorizing and filtering medium and its accumulated impurities will settle down through said fluid, a third fraction of said decolorizing and filtering medium and its accumulated impurities remaining substantially in suspension in said fluid, separately withdrawing each of said respective fractions of decolorizing and filtering medium and its accumulated impurities in a portion of said fluid, and thereafter treating each of said portions of fluid and contained fraction of decolorizing and filtering medium to recover purified filtrate therefrom.

39. The method of decolorizing and filtering saccharine fluids, such as sugar melts, affinations and other "run-offs," syrups and molasses, which comprises stirring such a fluid while the same has suspended therein a subdivided carbonaceous decolorizing and filtering medium of varied degrees of fineness derived from leached, carbonized lignin residues, permitting said fluid to settle, said fluid having such a density and the impurities thereof being such that a fraction of said decolorizing and filtering medium and its accumulated impurities will rise up through said fluids while another fraction of said decolorizing and filtering medium and its accumulated impurities will settle down through said fluid, a third fraction of said decolorizing and filtering medium and its accumulated impurities remaining substantially in suspension in said fluid, separately withdrawing each of said respective fractions of decolorizing and filtering medium and its accumulated impurities in a portion of said fluid, and thereafter treating each of said portions of fluid and contained fraction of decolorizing and filtering medium to recover purified filtrate therefrom.

40. The method of decolorizing and filtering saccharine fluids, such as sugar melts, affinations and other "run-offs," syrups and molasses, which comprises stirring such a fluid while the same has suspended therein a subdivided carbonaceous decolorizing and filtering medium of varied degrees of fineness, permitting said fluid to settle, said fluid having such a density and the impurities thereof being such that a fraction of said decolorizing and filtering medium and its accumulated impurities will rise up through said fluid while another fraction of said decolorizing and filtering medium and its accumulated impurities will settle down through said fluid, separately withdrawing each of said respective fractions of decolorizing and filtering medium and its accumulated impurities in a portion of said fluid, and thereafter treating each of said portions of fluid and contained fraction of decolorizing and filtering medium to recover purified filtrate therefrom.

41. The method of decolorizing and filtering saccharine fluids, such as sugar melts, affinations and other "run-offs", syrups and molasses, which comprises stirring such a fluid while the same has suspended therein a subdivided decolorizing and filtering medium, of varied degrees of fineness, permitting said fluid to settle, said fluid having such a density and the impurities thereof being such that a fraction of said decolorizing and filtering medium and its accumulated impurities will rise up through said fluid while another fraction of said decolorizing and filtering medium and its accumulated impurities will settle down through said fluid, separately withdrawing each of said respective fractions of decolorizing and filtering medium and its accumulated impurities in a portion of said fluid, and thereafter treating each of said portions of fluid and contained fraction of decolorizing and filtering medium to recover purified filtrate therefrom.

42. The method of decolorizing and filtering saccharine fluids, such as sugar melts, affinations and other run-offs", syrups and molasses, which comprises stirring such a fluid while the same has suspended therein a subdivided carbonaceou decolorizing and filtering medium of varied degrees of fineness derived from leached, carbonized lignin residues, permitting said fluid to settle, said fluid having such a density and the impurities thereof being such that a fraction of said decolorizing and filtering medium and its accumulated impurities will rise up through said fluid while another fraction of said decolorizing and filtering medium and its accumulated impurities will settle down through said fluid, separately withdrawing each of said respective fractions of decolorizing and filtering medium and its accumulated impurities in a portion of said fluid, and thereafter treating each of said portions of fluid and contained fraction of decolorizing and filtering medium to recover purified filtrate therefrom.

43. The method of decolorizing and filtering saccharine fluids, such as sugar melts, affinations and other "run-offs", syrups and molasses, which comprises stirring such a fluid while the same has suspended therein a subdivided carbonaceous decolorizing and filtering medium of varied degrees of fineness, permitting said fluid to settle, said fluid having such a density and the impurities thereof being such that a fraction of said decolorizing and filtering medium and its accumulated impurities will rise up through said fluid while another fraction of said decolorizing and filtering medium and its accumulated impurities will settle down through said fluid, a third fraction of said decolorizing and filtering medium and its accumulated impurities remaining substantially in suspension in said fluid, separately withdrawing each of said respective fractions of decolorizing and filtering medium and its accumulated impurities in a portion of said fluid, and treating each of said portions of fluid and contained fraction of decolorizing and filtering medium to recover purified filtrate therefrom.

In testimony whereof, we have signed our names to this specification this 24th day of December, 1925.

LEONARD WICKENDEN.
JOHN J. NAUGLE.